United States Patent [19]

Shopp

[11] Patent Number: 5,296,964
[45] Date of Patent: Mar. 22, 1994

[54] REPLACEABLE FASCIA FOR PROJECTION SCREEN CASE

[75] Inventor: Rick A. Shopp, New Castle, Ind.

[73] Assignee: Draper Shade & Screen Co., Inc., Spiceland, Ind.

[21] Appl. No.: 116,352

[22] Filed: Sep. 2, 1993

Related U.S. Application Data

[62] Division of Ser. No. 940,548, Sep. 4, 1992, Pat. No. 5,274,499.

[51] Int. Cl.⁵ .......................... E06B 9/00; G03B 21/56
[52] U.S. Cl. ...................................... 359/443; 160/19; 359/461
[58] Field of Search ........................ 359/443, 450, 461; 160/19, 23.1, 29, 66, 108, 120, 239; 16/87.4 R

[56] References Cited

U.S. PATENT DOCUMENTS

| | | | |
|---|---|---|---|
| 1,731,124 | 10/1929 | Carper | 160/108 X |
| 3,640,603 | 2/1972 | Balmes | 350/124 |
| 3,927,075 | 1/1967 | Howell et al. | 160/19 |
| 3,996,987 | 12/1976 | Rodriguez | 160/19 |
| 4,045,123 | 8/1977 | Brown | 350/117 |
| 4,059,339 | 11/1979 | Brown | 350/117 |
| 4,060,310 | 11/1977 | Brown | 350/117 |
| 4,072,404 | 2/1978 | Brown | 350/117 |
| 4,110,003 | 8/1978 | Zinn | 350/117 |
| 4,159,162 | 6/1979 | Christoffel | 350/117 |
| 4,169,658 | 10/1979 | Brown | 350/118 |
| 4,254,813 | 3/1981 | Vecchiarelli | 160/19 |
| 4,399,855 | 8/1983 | Volfson | 160/23 R |
| 4,739,567 | 4/1988 | Carlson | 40/471 |
| 4,935,988 | 6/1990 | Ford et al. | 16/87.4 R |

OTHER PUBLICATIONS

Ambassador, Draper Shade & Screen Co., Inc. product brochure, 1990.
Lumalectric, Draper Shade & Screen Co., Inc. production brochure, 1990.
Rolleramic, Draper Shade & Screen Co., Inc. production brochure, 1990.
Envoy, Draper & Shade & Screen Co., Inc. product brochure.
Targa, Draper Shade & Screen Co., Inc. product brochure.
New Screens for New Technologies, Draper Shade & Screen Co., Inc. product brochure, 1989.

*Primary Examiner*—Richard A. Wintercorn
*Attorney, Agent, or Firm*—Baker & Daniels

[57] ABSTRACT

A casing for a projection screen and a motorized projection screen system and method for controlling the same are disclosed herein. The casing includes a fascia and endcaps which are affixed to the casing spine without the use of tools thereby providing easy access to the working components housed within the casing and providing flexibility to the consumer in the appearance of the casing. The motorized projection screen system includes a roller having a projection screen attached thereto and a reversible motor operatively connected to the roller such that rotation of the motor causes the roller to rotate and the projection screen to be raised or lowered. The system also includes a biasing mechanism operatively connected to the roller such that rotation of the roller to lower the projection screen biases the roller toward rotation in the opposite direction. The biasing mechanism reduces the power requirements of the reversible motor of the system as it assists in lifting the weight of the projection screen. Furthermore, in one embodiment, the motor utilized is a DC motor and the system includes a DC power supply thereby providing a portable system and eliminating the requirement to connect the system to an external power supply.

7 Claims, 5 Drawing Sheets

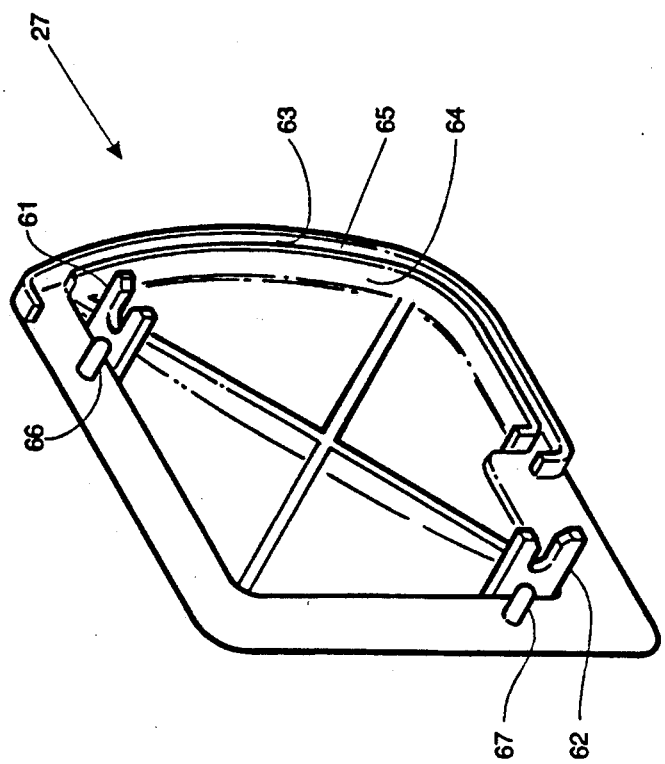
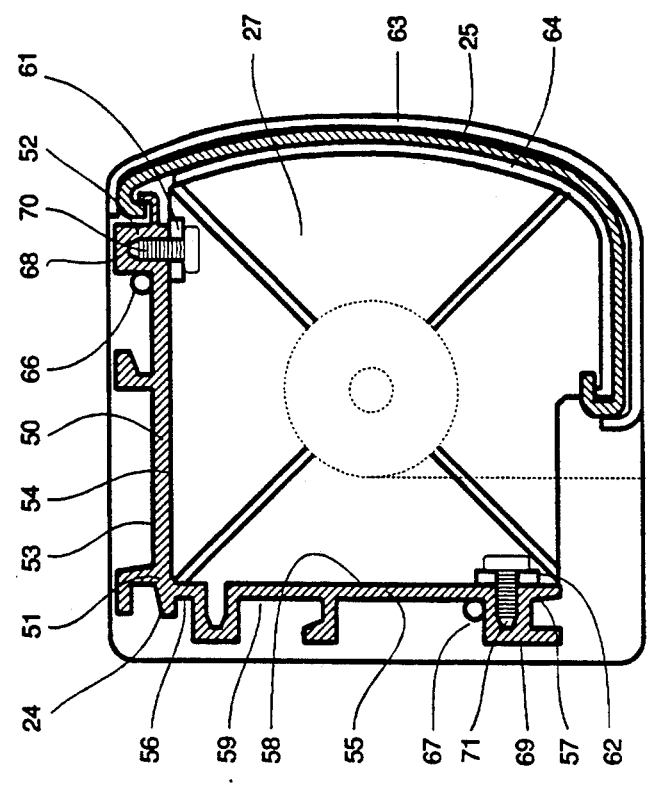
Fig. 5
Fig. 6

REPLACEABLE FASCIA FOR PROJECTION SCREEN CASE

CROSS REFERENCE TO RELATED APPLICATIONS

This is a division of application Ser. No. 07/940,548 filed Sep. 4, 1992, now U.S. Pat. No. 5,274,499, issued Dec. 28, 1993.

FIELD OF THE INVENTION

This invention relates to front projection screen systems, and, in particular, to electrically powered front projection screens and casing for the same.

BACKGROUND OF THE INVENTION

Front projection screens are those which are viewed from the same side of the screen from which the image is cast onto the screen and are generally available in two types—manual screens, such as those used in the home for viewing slides or home movies, and electrically powered screens as may be used in a conference room or board room. Electrically powered projection screens comprise an AC motor for driving the roller about which the screen is wound and are generally operated via remote control or with controls located on a wall in the room in which the projection screen is installed. A casing is provided which houses the screen, the roller about which the screen is wound and the motor. Two types of AC motors have been utilized to power projection screens. Traditionally, gear motors as are available from Emerson Electric are positioned near the roller of the projection screen. Projection screens using gear motors include the Ambassador, Rolleramic and Luma-Lectric Models available from Draper Shade & Screen Co., Inc. of Spiceland, Ind. For smaller screens, a gear motor may draw approximately 1.4 amps and produce 38 inch-pounds of torque and 35 rpm. For larger screens, a motor drawing 3 amps and producing 240 inch-pounds of torque at 13.6 rpm may be required.

More recent advances in technology have produced tubular AC motors which are able to fit within the roller of the projection screen. Thus, tubular motors are advantageous in that the size of the casing required to house the projection screen's working components is significantly less than for an electrically powered projection screen which utilizes a traditional gear motor. Tubular motors are available from such sources as Somfy of Cluses, France and typically draw 1.1 amps and produce 50 inch-pounds of torque at 35 rpm. Examples of projection screens which use a tubular AC motor encased within the roller include the Targa, Envoy, Artisan/Series E and Premier Series models offered by Draper Shade & Screen Co., Inc. of Spiceland, Ind.

The requirement of electrically powered projection screens to be connected to an AC power source presents difficulty when installing an electrically powered projection screen in an existing office or room, as power must be routed from an existing power source to the projection screen. Should the consumer be leasing office space which cannot be modified, installation of an electrically powered projection screens may not be feasible to these power requirements. Furthermore, if the screen is installed in a leased office space, the cost of removing the screen and reinstalling it in another installation site is prohibitive. Thus, it is desirable to provide a portable, electrically powered projection screen which may be easily retrofitted into an existing installation site.

The concept of providing an electrically powered projection screen driven by a DC motor is very attractive as a DC powered projection screen system would to be portable and may be retrofitted into an existing installation site at a reasonable cost. However, difficulties are encountered in obtaining a DC motor of appropriate dimensions which is capable of winding and unwinding the screen about the roller, particularly when the screen is of a significant size, as DC motors typically provide less torque than AC motors produce. Thus, it is desirable to provide a projection screen which uses a reasonably sized DC motor. Furthermore, such a DC motor should be conservative in the amount of battery power it consumes to roll and unroll the screen. The projection screen system should also be comprised of inexpensive, reliable components and be inexpensive to manufacture. In addition, to limit the size of the casing required to house the projection screen's working components, it is desirable to utilize a tubular DC motor which may be located within the roller.

Projection screens as may be found in a conference room usually comprise a casing housing the screen, the roller and the motor. Fasteners are provided which allow the casing to be suspended from a ceiling, hung flush with the ceiling and/or hung on a wall. In some systems, such as in the Ambassador model projection screen offered by Draper Shade & Screen Co., Inc. of Spiceland, Ind., the casing is installed above the ceiling and has a pivotable door through which the screen is lowered. However, when the fascia of the casing is visible, it is desirable to provide fascias of various textures and colors so that the casing matches the decor of the room in which it is installed. Furthermore, it is quite possible that the decor of the room may change and therefore it is desirable to provide a fascia whose appearance and texture may also be easily changed to match the new color. Therefore, under ideal circumstances, it is desirable to provide a fascia for the casing which may be installed without the use of tools and which is easy to replace and to decorate such as in the application of paint or wallpaper to the fascia. If the fascia may be removed and replaced without the use of tools, easier and quicker access to the working components housed in the casing results. Such access helps to reduce labor costs associated with repairing or maintaining the components housed in the casing. Thus it is desirable to provide a fascia for the casing of a projection screen which is easy to remove, to decorate once removed and to reinstall for both aesthetic and repair and maintenance reasons. It is also desirable to provide a fascia which is inexpensive and easy to manufacture.

OBJECTS OF THE INVENTION

Accordingly, it is one object of the present invention to provide a portable, electrically powered projection screen which may be easily retrofitted into an existing installation site.

It is another object of the present invention to provide an electrically powered projection screen which is inexpensive to manufacture and which is comprised of reliable components.

It is still another object of the present invention to provide a projection screen which utilizes a reasonably sized DC motor which is conservative in the amount of battery power consumed by the motor, is inexpensive and is tubular in form so that the DC motor may be installed within the roller.

It is yet another object of the present invention to provide a fascia for the casing housing the projection screen components which may be installed without the use of tools and which is easy to replace and to decorate.

It is another object of the present invention to provide a replaceable fascia for a projection screen casing which is easy and inexpensive to manufacture.

It is still another object of the present invention to provide a casing for supporting a fascia which accommodates a wide variety of fascias of different colors and textures.

It is yet another object of the present invention to provide a projection screen to which access to the working components housed within the casing is easy to obtain thereby making servicing or preventative maintenance simpler and less expensive to perform.

BRIEF DESCRIPTION OF THE DRAWINGS

FIG. 5 shows a perspective view of one embodiment of a replaceable endcap of the present invention.

FIG. 6 shows a cross-sectional view of the casing of the present invention at line 6—6 of FIG. 1.

SUMMARY OF THE INVENTION

The invention comprises a casing for a projection screen and a motorized projection screen system and method for controlling the same. The casing of the present invention includes a spine to which a removable fascia and replaceable endcaps are affixed without the use of tools to provide easy access to the working components of the projection screen within the casing and to allow the consumer to select from a multitude of textures and colors for the casing or to allow the consumer to decorate the fascia and endcaps. The motorized projection screen system of the present invention includes a roller having a projection screen affixed thereto, a reversible motor engaging the roller for raising and lowering the projection screen as rotation of the motor causes the roller to rotate, and a biasing mechanism. The biasing mechanism is operatively connected to the roller such that rotation of the roller to lower the projection screen biases the roller toward rotation in the opposite direction. In this manner, the biasing mechanism assists in raising the projection screen, thereby reducing the power requirements of the reversible motor of the system. In one embodiment thereof, the reversible motor of the projection screen system is a DC powered, reversible motor and the system also includes a DC power supply such as a rechargeable battery, permitting the system to be installed without connection to an external power supply and also providing a portable motorized projection screen system.

DETAILED DESCRIPTION

Figure 1:
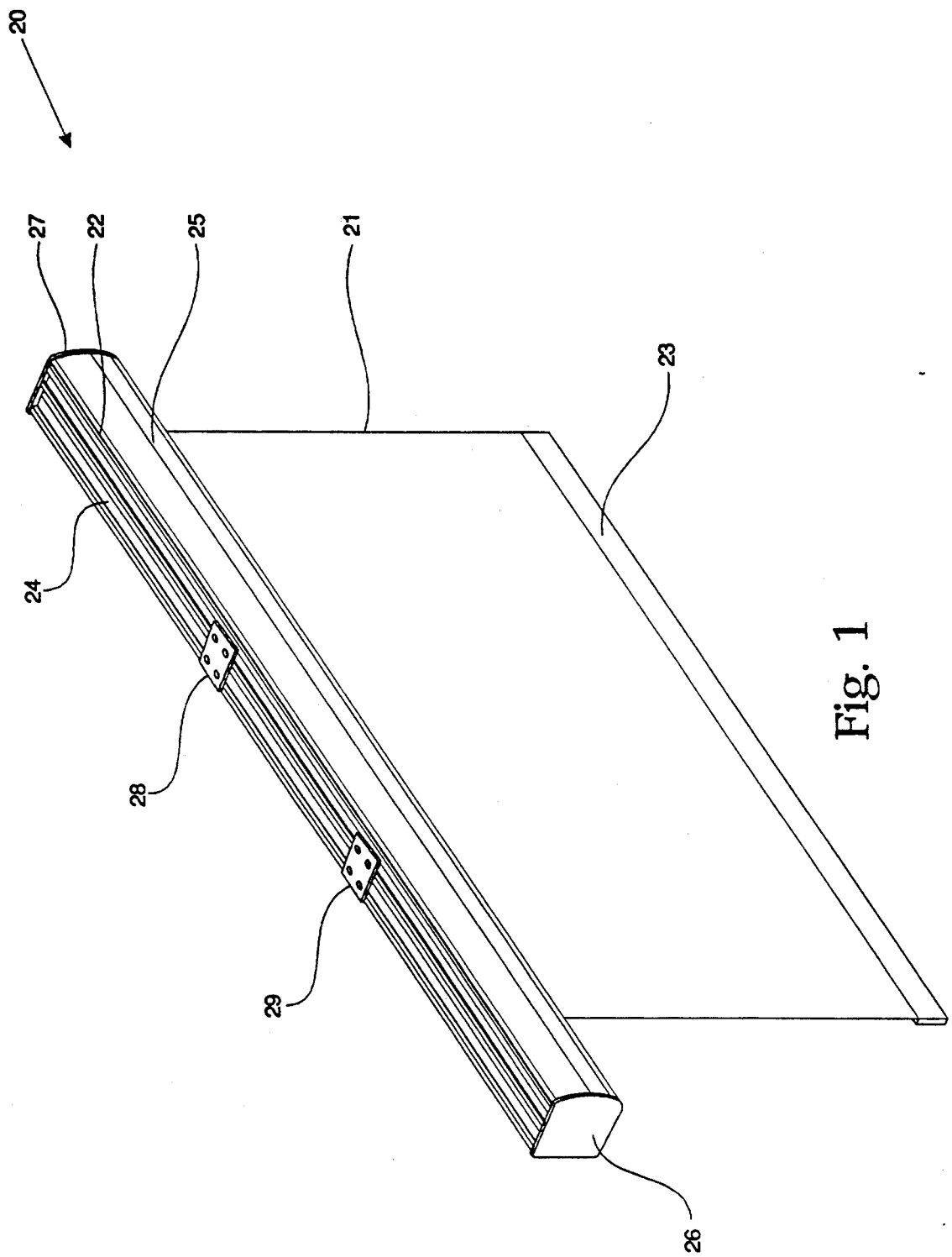
FIG. 1 shows a perspective view of one embodiment of the front projection screen system of the present invention.

Referring now to FIG. 1, there is shown a perspective view of one embodiment of the front projection screen system of the present invention. Projection screen 20 includes flexible screen 21, shown in FIG. 1 as extended or in the viewing position, and casing 22 from which screen 21 extends and inside which screen 21 is stored when in the retracted or in the non-viewing position. In this embodiment, screen 21 also includes weight strip 23 which assists in keeping screen 21 flat when in the viewing position and also helps to ensure the smooth rolling and unrolling of screen 21 from the roller (see FIGS. 2 and 7) to which screen 21 is affixed. Casing 22 includes substantially L-shaped spine 24 (see FIGS. 2, 4 and 6) to which replaceable fascia 25 and replaceable endcaps 26, 27 are affixed. Attached to spine 24 of casing 22 are first and second ceiling brackets 28 and 29, respectively, for attachment of projection screen 20 to a ceiling. Similarly, wall brackets (not shown) may be attached to the back of spine 24 for attachment of projection screen 20 to a wall.

Figure 2:
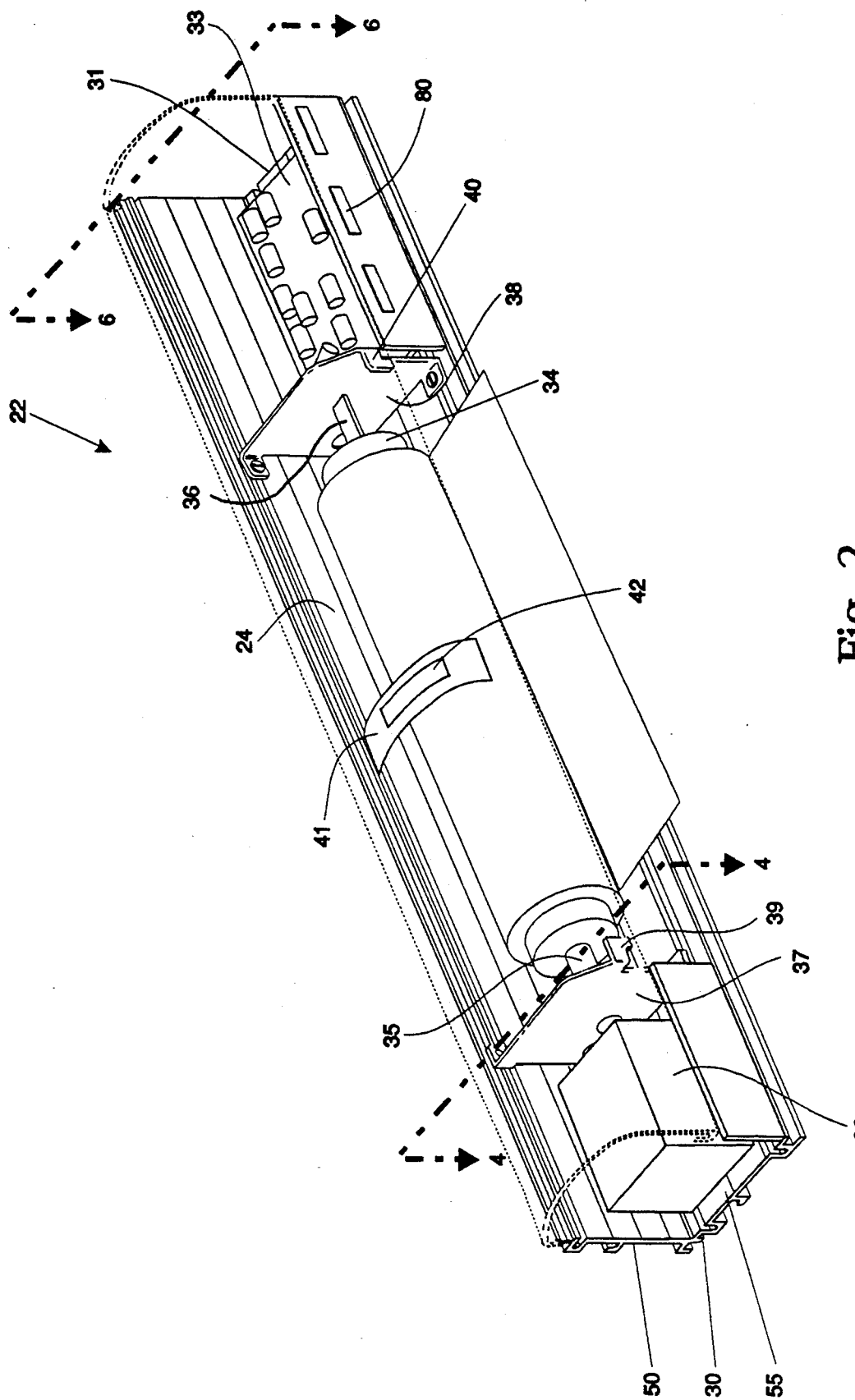
FIG. 2 shows a perspective view of one embodiment of the projection screen system of the present invention.
Figure 4:
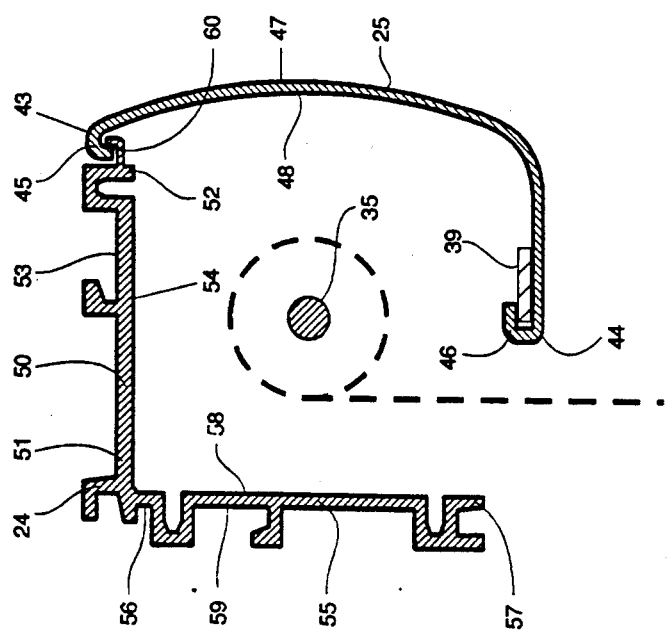
FIG. 4 shows a cross-sectional view of the casing of the present invention at line 4—4 of FIG. 2.

FIG. 2 shows a perspective view of one embodiment of the projection screen system of the present invention. Casing 22 includes a spine 24 having first end 30 and second end 31 opposite first end 30. At first end 30, rechargeable battery 32, a DC power supply, is mounted to spine 24. At second end 31 is mounted control means 33 for controlling the motor (see FIG. 7) located inside roller 34. Control means 33 is operatively connected via wires to battery 32 and to the motor and control means 33 is actuated by a user through control panel 80 mounted on spine 24 at second end 31. Control panel 80 may comprise selectors for rotating the motor (see FIG. 7) housed within roller 34 in either direction and for stopping the motor. Roller 34 is rotatably mounted to spine 24 via stationary first and second shafts 35 and 36, respectively, which are mounted to first and second brackets 37 and 38, respectively. Extending from first bracket 37 is first protrusion 39 and extending from second bracket 38 is second protrusion 40. First and second protrusions 39 and 40 engage replaceable fascia 25 as shown in FIG. 4. Also attached to casing 24 is third bracket 41 having fastening means 42 thereon for engaging replaceable fascia 25. In this embodiment, fastening means 42 comprises a velcro strip.

It will be appreciated by those of skill in the art that the layout of the projection screen components illustrated in FIG. 2 may be utilized to accommodate a variety of screen or roller 34 sizes. Should a different size roller be required, the length of spine 24 may be adjusted accordingly.

Figure 3:
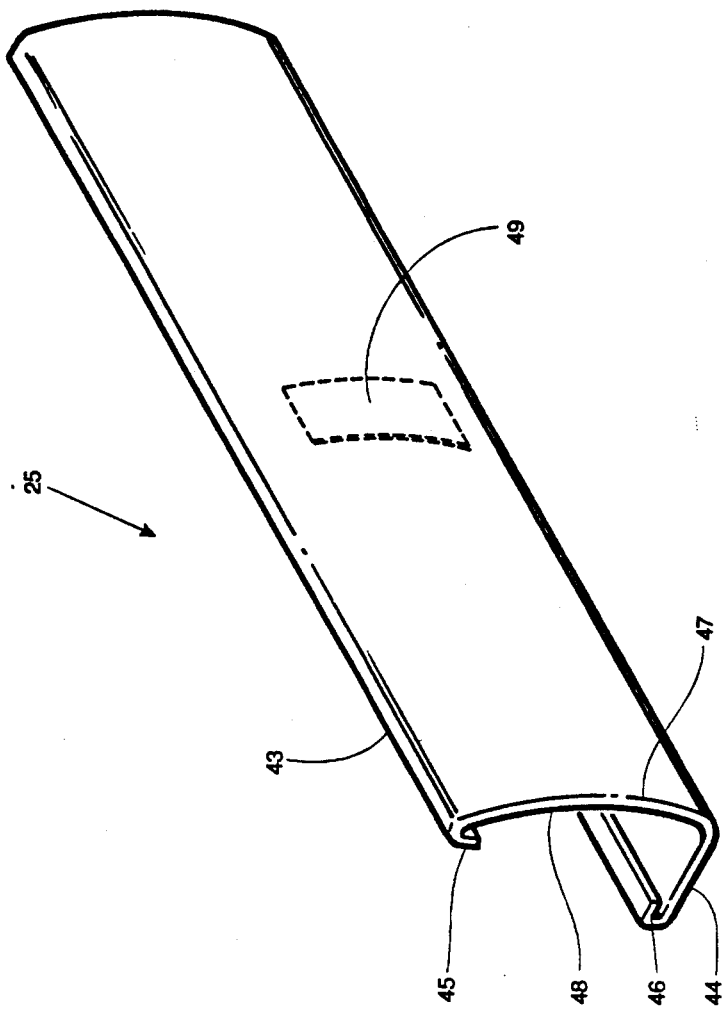
FIG. 3 shows a perspective view of one embodiment of the removable fascia of the present invention.

Referring now to FIG. 3, there is shown a perspective view of one embodiment of the replaceable fascia of the present invention. Fascia 25 has first and second edges 43 and 44, respectively. First edge 43 has first ridge 45 for engaging spine 24 and second edge 44 has second ridge 46 for engaging first and second protrusions 39 and 40 as shown in FIG. 4. In this embodiment, fascia 25 is made of extruded ABS plastic and may be of a variety of textures and colors. Fascia 25 also comprises upper side 47 and underside 48 opposing upper side 47. Fastener 49 for engaging fastening means 42 of third bracket 41 as shown in FIG. 2 is disposed on underside 48.

FIG. 4 shows a cross-sectional view of the casing of the present invention at line 4—4 of FIG. 2. In this embodiment, spine 24 includes first substantially rectangular plate 50 having first and second opposing ends 51 and 52, respectively, and top and bottom sides 53 and 54, respectively. Spine 24 also includes second substantially rectangular plate 55 having first and second opposing ends 56 and 57, respectively, and right and left sides 58 and 59, respectively. First end 51 of first plate 50 is joined with first end 56 of second plate 55 to form spine 24 wherein bottom side 54 of first plate 50 and right side 58 of second plate 55 define the interior angle of spine 24. In this embodiment, first and second plates 50 and 55 are of unitary construction, i.e., a single continuous piece of material such as extruded aluminum. First plate 50 also includes trough 60 along top side 53 of second edge 52 of first plate 50. As illustrated, fascia 25 is affixed to spine 24 by engaging first ridge 45 with trough 60 of first plate 50 and by engaging second ridge 46 of fascia 25 with first protrusion 39 and with second protrusion 40 (see FIG. 2). Furthermore, once engaged, at least a portion of underside 48 of fascia 25 faces the interior angle of spine 24 such that fastener 49 (see FIG. 3) of fascia 25 engages fastening means 42 of third bracket 41 (see FIG. 2).

It will be appreciated by those of skill in the art that fascia 25 of the present invention may be installed without the use of tools. By positioning fascia 25 so that first ridge 45 engages trough 60 of spine 24, a force may be applied to upper side 47 of fascia 25 toward the interior angle of spine 24 such that second ridge 46 of fascia 25 snaps into place engaging first and second brackets 37 and 38 and such that fastener 49 engages fastening means 42 of third bracket 41. To remove fascia 25 from spine 24, applying a force to upper side 47 toward the interior angle of spine 24 while simultaneously applying a force proximate second end 44 of fascia 25 away from the interior angle of spine 24 disengages second ridge 46 fascia 25 from first and second protrusions 39 and 40 to thereby allow fascia 25 to be lifted away from the interior angle of spine 24 to disengage fastener 49 from fastening means 42 and to disengage fastener 49 from fastening means 42 and to disengage first ridge 45 of fascia 25 from trough 60 of L-shape spine 24.

It will be further appreciated that the number of brackets having a protrusion therefrom and the number of brackets having a fastening means affixed thereto may vary depending on the length of the fascia to be attached to the spine as is determined by the length of the roller or screen to be accommodated by the casing. For example, several brackets having a fastening means may be desired to be positioned over that portion of the spine housing a long roller. For a very short roller disposed at one end of a casing, only one bracket having a protrusion therefrom may be necessary.

It will also be appreciated that the provision of a replaceable fascia as disclosed herein allows the consumer to coordinate the texture and color the fascia with the decor of the room in which the projection screen is installed. Different fascias may be provided by the manufacturer or the consumer may paint or wallpaper the fascia. Should the consumer desire to change the appearance of the fascia, a new one may be purchased or the existing fascia may be removed and redecorated accordingly.

It will be further appreciated that an easily removable and replaceable fascia is advantageous when an individual is to perform preventative maintenance or is to service the components housed within the casing of the projection screen. Access is made easy with the fascia of the present invention and labor costs are significantly reduced as no screws or bolts need to be removed and replaced to service the components housed within the casing of the projection screen.

To cover first and second ends 30 and 31 (see FIG. 2) of casing 22, replaceable endcaps 26 and 27 (see FIG. 1) are provided. Replaceable endcaps 26 and 27 need no tools for installation and removal thereby complimenting the advantages provided with replaceable fascia 25. Referring now to FIG. 5, there is shown a perspective view of one embodiment of the replaceable endcap of the present invention. In this embodiment, replaceable endcap 27 is comprised of injection molded ABS plastic and is affixed to second end 31 of spine 24 as shown in FIG. 6. The surface of endcap 27 shown in FIGS. 5-6 faces first end 30 of spine 24. The opposing side (not shown) is made of a texture and color suitable for exposure and may be the same or similar to the exterior or upper side 47 of fascia 25. In the embodiment of FIG. 5, endcap 27 includes first and second fastening means 61 and 62 respectively, first and second ridges 63 and 64 defining trough 65 therebetween, and first and second guiding means 66 and 67, respectively, protruding from endcap 27. Trough 65 is positioned such that endcap 27 engages fascia 25 when both fascia 25 and endcap 27 are affixed to spine 24.

FIG. 6 shows a cross-sectional view of the casing of the present invention at line 6—6 of FIG. 1 and wherein the endcap of FIG. 5 is installed on the casing. Spine 24 includes first U-channel 68 within bottom side 54 of first plate 50 along second edge 52 of first plate 50 and second U-channel 69 within right side 58 of second plate 55 along second edge 57 of second plate 55. First and second U-channels 68 and 69, respectively, receive first and second fasteners 70 and 71, respectively. As shown, first fastening means 61 of endcap 27 engages first fastener 70 and second fastening means 62 of endcap 27 engages second fastener 70 such that endcap 27 substantially covers second end 31 of spine 24 and such that endcap 27 engages spine 24. In this embodiment, first and second guiding means 66 and 67 engage the exterior of spine 24. More specifically, first guiding means 66 engages top side 53 of first plate 50 and second guiding means 67 engages left side 59 of second plate 55.

It will be appreciated by those of skill in the art that the replaceable endcap of the present invention, like the fascia of the present invention, may be installed or removed without the use of tools. To install endcap 27, first and second fastening means 61 and 62 are positioned proximate first and second fasteners 70 and 71, respectively, and a force is applied toward spine 24 to snap endcap 27 into place. Guiding means 66 and 67 assist the user in positioning endcap 27. To remove endcap 27, endcap 27 is pulled away from spine 24 to disengage first and second fastening means 61 and 62 from first and second fasteners 70 and 71.

It will be further appreciated that the visible portions of the casing according to the present invention, namely the fascia and endcaps, may be decorated as desired by the consumer. Furthermore, an overall aesthetically pleasing appearance is maintained as the endcaps mate with the fascia. Also, easy access to the components housed within the casing is maintained with the provision of the replaceable endcaps.

Figure 7:
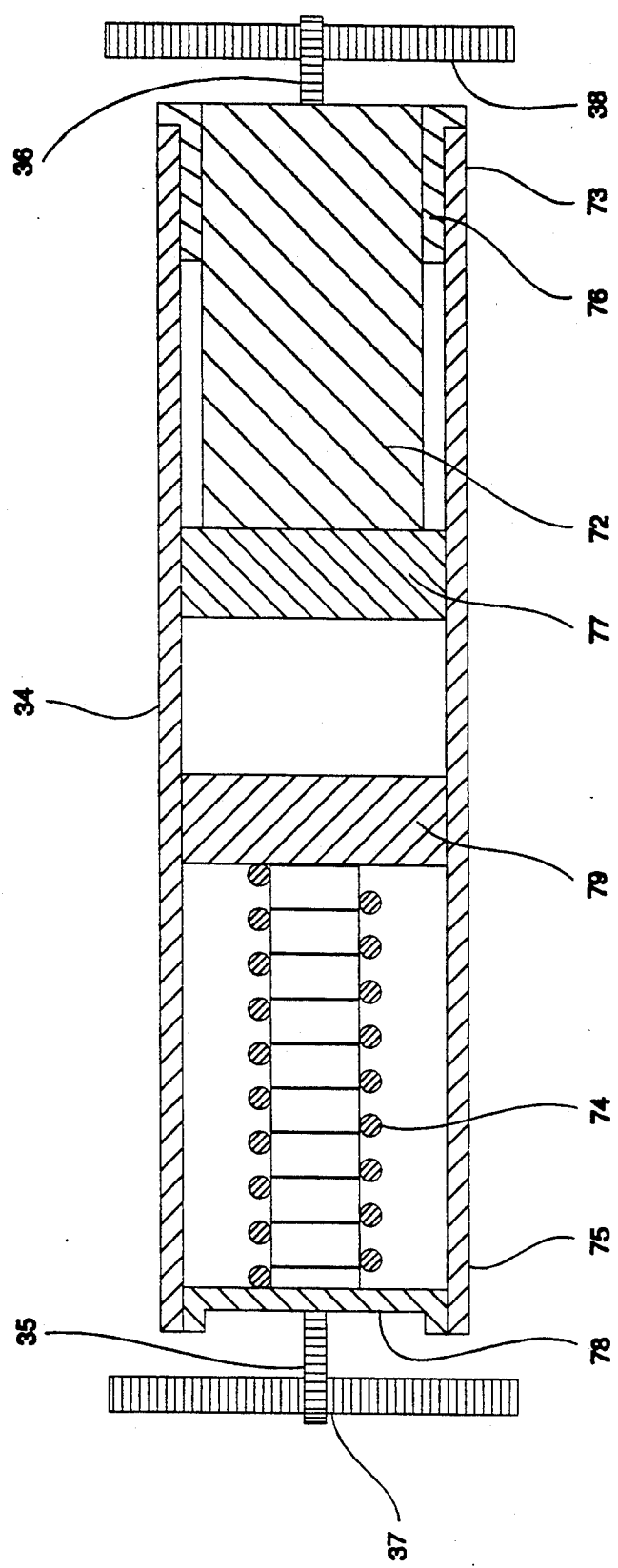
FIG. 7 shows a partial cross-sectional view of one embodiment of the spring assisted, DC powered roller of the present invention.

Referring now to FIG. 7, there is shown a partial cross-sectional view of one embodiment of the spring assisted, DC powered roller of the present invention. In this embodiment, DC powered reversible motor 72 is disposed within first end 73 of hollow roller 34 and bias means 74 is disposed within second end 75 of hollow roller 34. To compensate for motor 72 having a diameter smaller than the inner diameter of tubular roller 34, crown adapter 76 is placed about motor 72 to secure motor 72 to roller 34 at first end 73 of roller 34. Motor 72 includes drive wheel 77 which engages roller 34 such that when motor drive wheel 77 rotates, roller 34 also rotates about first and second stationary shafts 35 and 36, respectively.

Bias means 74, a torsion spring, is connected to stationary cap 78 and to bung 79. Bung 79 engages roller 34 but stationary cap 78 does not engage roller 34 such that when roller 34 rotates, bung 79 rotates and stationary cap 78 does not rotate. Bias means 74 may be unbiased or preset such that bias means 74 is under some tension (pre-tensioned) when the projection screen is in its retracted or wound position. Both the unbiased and pre-tensioned states of bias means 74 are referred to herein and in the claims as the "non-biased position" of bias means 74. Thus, if bias means 74 is in the non-biased position, rotation of motor 72 causes roller 34 to rotate and bias means 74 biases roller 34 toward the unbiased state of bias means 34, or, in other words, bias means 74 biases roller 34 in the opposite direction from the direction motor 72 has rotated.

During operation of the roller of the present invention, bias means 74 is in the non-biased position when screen 21 is in its retracted, non-viewing position, i.e., is wound around roller 34 within casing 22. To unwind or lower screen 21 toward the viewing position wherein screen 21 is outside casing 22 as shown in FIG. 1, motor 72 is turned on or activated and rotated in the appropriate direction to unwind screen 21. Such rotation causes bias means 74 to bias roller 34 toward the unbiased state of bias means 74, i.e. toward the wound position of screen 21. Thus, when motor 72 is stopped and motor 72 is rotated in the opposite, or winding, direction, bias means 74 assists motor 72 in winding screen 21 around roller 34 to thereby raise screen 21.

It will be appreciated by those of skill in the art that bias means 74 helps to lift the weight of screen 21 and weight strip 23 into casing 22. Thus, a smaller motor may be utilized than is required when no assistance to the motor is provided in lifting the weight. This is particularly important for larger projection screens wherein a DC powered reversible motor of sufficient power which fits within the internal diameter of the roller may not be available or, if available, is not reasonably priced. Should a large motor be employed, significant changes to the projection screen making it prohibitively expensive, unsightly, or impractical may be necessitated.

In comparing the power requirements of tubular AC motors to tubular DC motors, a 115 volt tubular AC motor may require 100 watts of power at 35 rpm, while a tubular DC motor working in conjunction with the spring assisted roller of the present invention may only require 7 watts of power. Without the spring-assisted roller, a tubular DC motor may require 11 watts of power at only two-thirds (⅔) of the speed. Thus, the present invention results in an efficient system capable of rolling or raising a projection screen at the same speed as an AC tubular motor.

It will be further appreciated that the provision of a spring assisted, DC powered projection screen allows the screen to be portable. No special external power requirements exist thereby permitting the projection screen to be installed in an existing office site or in a leased office or simply to be hung from a door.

As used herein and in the claims, the terms "removable" and "replaceable" are used interchangeably and are both used to describe the fact that the object may be removed from the casing without the use of tools and may be replaced, again without the use of tools, with the same object or with an object of comparable structure if so desired.

What is claimed is:

1. A casing for a projection screen, comprising:
   a spine including first and second substantially rectangular plates, each plate having first and second opposing edges, the first plate having top and bottom sides and the second plate having right and left sides, such that the first and second plates are joined at their respective first edges and such that the bottom side of the first plate and the right side of the second plate define an interior angle, the first plate also including a trough along the top side of the second edge;
   a bracket affixed to the spine, the bracket having a protrusion therefrom positioned away from the right side of the second plate and below the bottom of the first plate; and
   a removable fascia having first and second edges, the first edge having a ridge for engaging the trough of the first plate and the second edge having a ridge for engaging the protrusion extending from the bracket.

2. The casing of claim 1 wherein the first plate, second plate and trough of the first plate are of unitary construction.

3. The casing of claim 1 wherein the fascia further comprises an upper side and an underside such that at least a portion of the underside of the fascia faces the interior angle of the spine when fastened via the trough of the first plate and the protrusion from the bracket, and wherein the fascia further comprises a fastener disposed on the underside of the fascia, the casing further comprising:
   a second bracket operatively connected to the first plate, the second bracket having a fastening means for engaging the fastener of the fascia.

4. The casing of claim 3 wherein the fastening means of the second bracket comprises a velcro strip.

5. The casing of claim 1 wherein the first plate comprises a U-channel along the second edge and on the bottom side of the first plate for receipt of a first fastener and the second plate comprises a U-channel along the second edge and on the right side of the second plate for receipt of a second fastener, and wherein the spine has two opposing ends, the casing further comprising:
   a replaceable endcap having a first fastening means for engaging the first fastener and a second fastening means for engaging the second fastener, the first and second fasteners located at one of the opposing ends of the spine such that the replaceable endcap substantially covers that end of the spine.

6. The casing of claim 5, wherein the fascia further comprises two opposing ends and wherein the replaceable endcap further comprises first and second ridges defining a trough therebetween for the receipt of one of the ends of the replaceable fascia.

7. The casing of claim 5 wherein the replaceable fascia further comprises a guiding means protruding from the fascia for engagement with the exterior of the spine.

* * * * *